United States Patent [19]

Bailey

[11] 4,284,938

[45] Aug. 18, 1981

[54] CHOPPER WITH ADAPTIVE ENERGY COMMUTATION

[75] Inventor: Ronald B. Bailey, Erie, Pa.

[73] Assignee: General Electric Company, Erie, Pa.

[21] Appl. No.: 973,973

[22] Filed: Dec. 28, 1978

[51] Int. Cl.³ .............................................. H02P 5/16
[52] U.S. Cl. ................................ 318/432; 318/345 G; 318/434
[58] Field of Search ................... 318/341, 345 C, 434, 318/432, 345 G; 307/252 M; 361/29; 323/124

[56] References Cited

U.S. PATENT DOCUMENTS

| | | | |
|---|---|---|---|
| 3,365,640 | 1/1968 | Gurwicz | 307/252 M |
| 3,535,559 | 10/1970 | Adams | 307/252 |
| 3,562,611 | 2/1971 | Gurwicz | 318/246 |
| 3,629,615 | 12/1971 | Gurwicz | 318/345 C |
| 3,657,625 | 4/1972 | Miller et al. | 318/326 |
| 3,659,119 | 4/1972 | Kasama et al. | 307/252 M |
| 3,993,942 | 11/1976 | Schmidt et al. | 318/341 |
| 4,011,777 | 4/1977 | Bailey | 318/342 |
| 4,032,825 | 6/1977 | Klimo | 318/341 |
| 4,074,175 | 2/1978 | Born et al. | 318/432 |

Primary Examiner—David Smith, Jr.
Attorney, Agent, or Firm—Albert S. Richardson, Jr.

[57] ABSTRACT

Apparatus for controlling the voltage on a commutating capacitor in a thyristor time ratio control power circuit whereby the energy stored in the capacitor may be continuously adjusted to a magnitude required for commutation so that the size of the commutating circuit can be significantly reduced. An inductive circuit is provided in a charging current path for the capacitor so that the capacitor can be charged above available source voltage by capacitive/inductive action. A controllable switch connected in parallel with the inductive circuit provides a short-circuit path for terminating charging of the capacitor. A logic circuit monitors capacitor voltage, source voltage and load current and closes the controllable switch when the capacitor voltage reaches a magnitude established by the logic circuit as sufficient to commutate the measured magnitude of load current.

7 Claims, 3 Drawing Figures

CHOPPER WITH ADAPTIVE ENERGY COMMUTATION

BACKGROUND OF THE INVENTION

The present invention relates to a time ratio control power system and, more particularly, to a time ratio control system for controlled energy commutation.

Performance requirements for electrically propelled vehicles, particularly torque-speed requirements, generally dictate the use of direct current (d-c) motors. The d-c motors may be any of the well known type of d-c motors such as, for example, series wound, compound wound or separately excited. Conventionally the armature winding of the d-c motor is energized by direct current controlled by resistors in series circuit arrangement with the motor. By selectively adding or subtracting resistance, the amount of power applied to the motor, and thus the motor performance, may be controlled. As is well known such a control system, although relatively simple, suffers from numerous maladies, the most onerous of which is inefficiency. For this reason time ratio control system or "choppers" have been substituted for series resistors in the more recently developed motor control systems.

In a series chopper control system a controllable switch is located between a source of d-c power and the motor armature, the controllable switch replacing the previously used resistor control. By cyclically opening and closing the switch, pulses of current are metered to the motor. During periods when the switch is open armature current can continue flowing through a free wheeling diode connected across the armature. The armature windings generally act as a large inductive load and tend to smooth the pulsating current into an average current, which determines motor torque. For lower inductance motors a smoothing reactor is connected in series with the motor. Because the switch is either opened or closed, power consumption is primarily in the energy required to open and close the switch and the energy utilized by the motor, although it should be noted that known switches are not ideal and thus some power is expended in the switch itself.

In the present state-of-the-art chopper control systems, the controllable switch is commonly a thyristor or silicon controlled rectifier (SCR). The SCR is a three-terminal device having anode, cathode and gate terminals. When the SCR is forward biased, i.e., the anode terminal is at a positive potential with respect to the cathode terminal, a current signal applied to the gate terminal will cause the SCR to be gated into conduction and to exhibit a negligible anode to cathode resistance. Once gated or fired in this manner, the SCR can only be turned off by subsequently reducing the current through the device to zero and then applying a reverse bias from anode to cathode for a time period sufficient to allow the SCR to regain its forward voltage blocking ability. In practical applications the SCR can be turned off by means of a "commutation" circuit connected in parallel therewith. A detailed description of SCR devices, chopper circuits and commutation circuits may be had by reference to the SCR Manual, Fifth Edition published in 1972 by General Electric Company, Semiconductor Products Department, Syracuse, N.Y.

A typical chopper commutation circuit is a "ringing" circuit, i.e., the circuit contains inductive and capacitive components which develop an oscillating or ringing current. A chopper commutation circuit may include, for example, a capacitor, an inductor, several diodes and a commutating SCR. The chopping frequency is determined by the frequency at which the motor-current conducting main SCR and commutating SCR are fired, and the duty factor is determined by the percentage of a period between consecutive firings of the main SCR that has elapsed when the commutating SCR is fired.

Each component in the commutating circuit must be sized, or rated, to meet the particular current requirements of the circuit application and also the duty factor of the chopper circuit. The actual rating of each component is dependent upon the total energy expended in the circuit, or more precisely, the rating is a function of the watt-seconds per pulse multiplied by the frequency or number of pulses per second. The rating of each of these components determines not only the cost of the commutation circuit but also the weight, efficiency and physical size of the circuit.

Since the function of the commutation circuit is to turn off the main load current carrying SCR, i.e., the controllable switch, a primary design consideration is to assure that the commutation circuit has the capability to perform this function. The capability of the commutation circuit is measured by the magnitude of current which it can supply. In order to commutate an SCR, the commutation circuit must be capable of supplying a current of magnitude greater than the average load current for a time period sufficient to allow the SCR to regain its forward blocking ability. Peak commutating current may be defined in mathematical form as: $I = E\sqrt{C/L}$ where I is the current capability, E is the voltage applied to the capacitor, C represents the size of the capacitor in farads and L represents the size of the inductor in henrys. Since commutation capability is proportional to peak commutating current, it becomes apparent that commutation capability can be varied by changing the voltage E, the capacitance C and the inductance L.

In a motor drive system electrical power may be supplied by a prime mover driven generator on board the vehicle or by an external source through a catenary, third rail or trailing cord arrangement. Regardless of the source of power, the voltage supplied by present day systems tends to vary as a function of load current. A typical system, for example, may experience a 2-to-1 voltage variation between low current and high current conditions, with the lowest voltage often occurring at the time when load current is at a maximum. In order to compensate for this voltage variation, it has been necessary to design commutation circuits to commutate rated load current at the lowest expected voltage. Such design techniques have resulted in the use of commutation circuit components of relatively large size, and the commutation circuit tends to be as large or larger than the main load current carrying components. Furthermore, the commutation circuit which supplies rated load current at half-voltage could commutate twice load current at full voltage. For example, a commutation circuit designed to commutate 2000 amperes at 1000 volts could commutate 4000 amperes at 2000 volts. In the typical vehicle system, the source voltage of 2000 volts could occur at low load current conditions, i.e., when the main SCR is supplying an average load current less than 1000 amperes. Accordingly, the commutating circuit must also be capable of dissipating the excess energy losses associated with the higher commutation circuit currents at 2000 volts.

OBJECT OF THE INVENTION

It is an object of the present invention to provide an improved commutation system.

It is a further object of the present invention to provide a commutation system for a thyristor which is capable of operating in a variable voltage environment.

It is a still further object of the present invention to provide an improved thyristor commutation system which significantly reduces the generation of excess commutation energy.

It is another object of the present invention to provide an improved thyristor commutation system which significantly reduces the size of the commutation components normally required for variable voltage operation.

SUMMARY OF THE INVENTION

In accordance with the present invention, a time ratio controlled thyristor switching circuit including a commutation circuit is connected to control the average current in a d-c electric traction motor. The commutation circuit includes a commutation capacitor which supplies the energy required to effect commutation of the main load current carrying thyristor. An inductive circuit is connected in a charging current path for the commutation capacitor. The inductive circuit forces charging current to continue flowing even though the voltage across the capacitor becomes greater than the available source voltage. A controllable switch is connected in parallel with the inductive circuit and is closed when the capacitor voltage reaches a desired value. Closing of the switch provides a low-impedance path and thus terminates charging of the commutating capacitor.

In a preferred embodiment the traction motor is utilized as the inductive circuit and the free wheeling diode normally shunting the motor is replaced by a thyristor. A regulating circuit monitors the voltage developed across the commutating capacitor and gates the thyristor into conduction when the capacitor voltage reaches a desired magnitude. Preferably this magnitude is varied as a function of motor current whereby excessive currents during light load conditions are avoided, while providing adequate commutation of heavy load current with low line voltage. The regulating circuit includes means for comparing the capacitor voltage to a signal representative of motor current and for providing a gating signal to the thyristor when the capacitor voltage reaches a level sufficient to commutate that magnitude of measured motor current. Additional protective features are incorporated into the regulator circuit to delay gating of the thyristor until after the capacitor voltage becomes at least as large as the available source voltage to thereby assure that the thyristor is forward biased at the time that gating occurs. A further protective feature is incorporated to force the regulator to provide a gating signal whenever capacitor voltage exceeds a predetermined maximum voltage. Noise immunity is provided by establishment of a predetermined relatively short time interval during which gating signals can be accepted.

BRIEF DESCRIPTION OF THE DRAWINGS

For a better understanding of the objects and features of this invention, reference may be had to the following description taken in conjunction with the accompanying drawings in which.

DETAILED DESCRIPTION OF THE INVENTION

Figure 1:
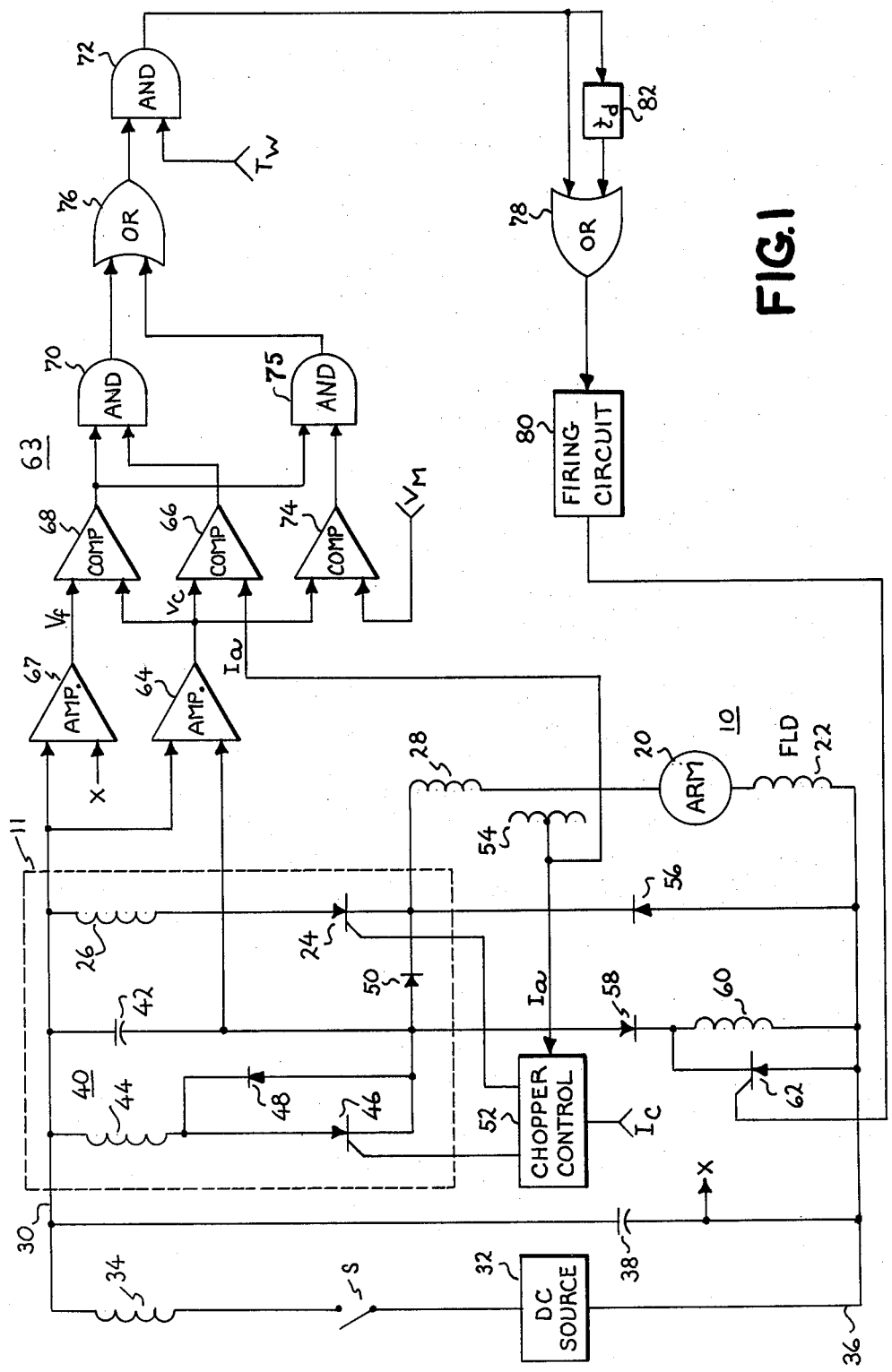
FIG. 1 is a simplified schematic diagram of a time ratio control power circuit and electric traction motor system incorporating the present invention.

Referring now to FIG. 1, there is shown a simplified schematic diagram of one form of the present invention as applied to a time ratio controlled power circuit or chopper 11 which is connected to regulate the application of power to a direct current electric traction motor 10. The d-c electric traction motor 10 is illustrated as a series wound motor having an armature 20 and a series connected field winding 22. A controlled switching device illustrated as a semiconductor controlled rectifier (SCR) 24, a commutating reactor 26 and a motor reactor 28 connect one terminal of armature 20 to a d-c power bus 30. A d-c source 32 supplies direct current power to bus 30 through a switch S and a filter reactor 34. The power circuit is completed by the connection from the lower terminal of field winding 22 to a negative power bus 36 which is connected to the d-c source 32. A filter capacitor 38 is connected between the bus 30 and bus 36 to smooth the transient voltages appearing on the bus 30 as a result of the switching action of SCR 24.

Connected in parallel circuit arrangement with the SCR 24 and commutating reactor 26 is a commutating circuit 40. Commutating circuit 40 comprises a commutating capacitor 42, a commutating inductor 44 and a commutating SCR 46. In addition there is provided a diode 48 shunting the SCR 46 which provides a reverse current path to allow SCR 46 to be turned off. Another diode 50 connects the commutating circuit 40 to the cathode terminal of SCR 24. The SCRs 24 and 46 are controlled by chopper control circuit 52 which supplies gating signals to gate terminals of the two SCRs in a manner to control the duty cycle of SCR 24 and thus to regulate the average current flowing through motor armature 20. A free wheeling diode 56 is connected in parallel circuit arrangement with motor 10 and reactor 28 to provide a motor current path when the chopper circuit 11 is non-conductive.

The chopper control circuit 52 is of a type well known in the art which is responsive to a current command signal $I_c$ and to a current feedback signal $I_a$ for regulating the duty cycle of SCR 24 in a manner to minimize the difference between the commanded current signal and the actual current feedback signal. A more detailed description of a chopper control circuit may be had by reference to U.S. Pat. No. 3,866,098—Weiser, issued Feb. 11, 1975 and assigned to the General Electric Company. In the present instance the current feedback signal $I_a$ is supplied by a current measuring device 54 connected in the armature current circuit. The current measuring device may be any one of a number of well known d-c current measuring devices such as, for example, a Hall effect device, a current shunt or a current measuring reactor including the appropriate circuitry for transmitting a signal representative of current. The current command signal $I_c$ is supplied from an operator's control (not shown) as a function of the desired output power or speed of the motor 10.

As is well known the average current flowing through armature 20 and field winding 22 is proportional to the duty factor or percent on time of SCR 24 and the rotational velocity of the motor. Letting $T_{on}$ equal the on time or conducting time of the SCR 24 and $T_{off}$ equal the off time or non-conducting time, duty factor is defined as $T_{on}/(T_{on}+T_{off})$. In order to initiate the on time of SCR 24, a gate pulse is supplied to the gate terminal of SCR 24 by chopper control circuit 52. In order to terminate the on time, a gate pulse is supplied from chopper control circuit 52 to a gate terminal of SCR 46. Since it is unnecessary to an explanation and understanding of the present invention, several elements well known in the art have been omitted from the illustrated motor circuit. In particular, the elements necessary for implementation of electrical braking or for implementation of field weakening have been omitted. For a more detailed description of a d-c series wound electric motor circuit reference may be had to U.S. Pat. No. 3,525,027—Weiser, issued Aug. 18, 1970 and assigned to the General Electric Company.

Before continuing the description of the inventive control circuit, the operation of the described motor circuit will now be detailed. With switch S closed, power is available between bus 30 and bus 36 for application to the motor 10. A firing signal applied to the gate terminal of SCR 24 by the chopper control circuit 52 triggers SCR 24 into conduction and allows current to flow from bus 30 through commutator reactor 26, SCR 24, motor reactor 28, motor armature 20, and field winding 22 to the bus 36 creating a torque and corresponding rotation of armature 20. After a predetermined time interval such as, for example, 0.001 second, a firing signal is applied to SCR 46 gating this SCR into conduction. The energy stored in commutating capacitor 42 discharges through the commutating inductor 44 and SCR 46. The reactive effect of the oscillatory combination of capacitor 42 and inductor 44 result in a reverse charge being accumulated on the capacitor 42, and within a relatively short time interval the potential at the junction intermediate diode 50 and SCR 24 rises to a magnitude more positive than the potential on the bus 30. Due to this higher potential at the cathode of SCR 24, a negative or reverse voltage is impressed across inductor 26 and current flow begins to transfer from the SCR 24 path to the path including the diode 50. Within several microseconds current has been completely transferred to diode 50 and SCR 24 has ceased conducting and is reverse biased. At the end of a time interval determined by the relative values of inductor 44 and capacitor 42, the current flowing through inductor 44 reverses direction and a current path through capacitor 42, diode 48 and inductor 44 is formed. Current flow through diode 48 reverse biases SCR 46 causing it to cease conducting. Load current to armature 14 continues to flow through capacitor 42 and diode 50 until capacitor 42 has recharged to a voltage magnitude equal to the voltage between the busses 30 and 36. At this time the potential at the cathode terminal of SCR 24 is essentially equal to that at bus 36. Thereafter, because of the inductive reactance of the motor armature 20 and field winding 22 along with the motor reactor 28, current continues to flow through capacitor 42, diode 50, armature 20 and field winding 22, and the capacitor 42 is further charged. This action results in the potential at the cathode terminal of SCR 24 falling to a magnitude more negative than the potential on bus 36. Now motor current begins to transfer to the loop comprising the free wheeling diode 56, motor reactor 28, armature 20 and field winding 22. By the time current has completely transferred to the loop including the free wheeling diode 56, capacitor 42 has reached an overcharged condition. This overcharge voltage on capacitor 42 is directly proportional to load current and circuit inductance and inversely proportional to the capacitance of capacitor 42. However, it is generally limited to a value within a few volts of the voltage on bus 36 since the diode 56 begins to conduct as soon as it becomes forward biased. After several milliseconds, depending upon the desired power output of the motor 10, a gating pulse is again applied to SCR 24 and the above-described cycle is repeated.

As is evident from the above discussion, the SCR 24 is periodically gated into conduction to thereby apply pulses of current from the source 32 to the motor armature 20 and field winding 22. It is also apparent that the commutating circuit components must be capable of supplying sufficient energy to (1) force current transfer from SCR 24 to capacitor 42, (2) apply a reverse bias to SCR 24 for sufficient time for that SCR to regain its forward voltage blocking capability, and (3) still have sufficient energy remaining in capacitor 42 to cause current flow through diode 48 in order to apply a reverse bias to SCR 46 for a time sufficient for it to regain its forward voltage blocking capability. If the commutating circuit is unable to supply this amount of energy, a "latch on" condition will result wherein a maximum available voltage is continuously applied to the motor 10 either through SCR 24 or SCR 46. Accordingly, incorporating sufficient commutating energy capability into the design of the commutating circuit is a primary concern in chopper control systems.

From the above discussion it will be apparent that the commutating capacitor 42 must be capable of supplying a peak current considerably in excess of the average motor current being supplied by the SCR 24. In general, peak commutating current must be approximately twice the magnitude of the peak load current. Because the typical d-c source 32 is not capable of supplying a constant voltage for all levels of current, the voltage on bus 30 tends to decrease with increasing motor current. In a typical traction motor application the voltage on bus 30 may vary over a two-to-one range, i.e., a nominal 2000 volts source voltage may decay to as low as 100 volts under full load conditions. Since the amount of energy which the commutating capacitor 42 can deliver is a function of the size of the capacitor and the voltage developed across it, it will be apparent that in order to supply maximum commutating energy at the lowest supply voltage, the capacitor must be designed around these criteria. In particular, it can be shown that for an oscillatory circuit with constant resonant frequency the capacitance must be doubled and the inductance halved in order to have sufficient commutating enery when the voltage on the supply bus has dropped to half value. At rated voltage this results in commutating capability being twice that needed for proper commutation.

The present invention provides a method and apparatus for significantly reducing the size of the commutating circuit while still providing sufficient energy to commutate both the main current carrying SCR and commutating SCR even under maximum power and low line voltage conditions. As shown in FIG. 1, in one embodiment of the present invention an inductive circuit is connected between the anode of diode 50 and the negative supply bus 36. The inductive circuit comprises the serial combination of diode 58 and inductor 60 with an inverse parallel connected thyrister or SCR 62 connected across the inductor 60. The diode 58 and inductor 60 provide an alternate charging current path for the capacitor 42 and allows the capacitor to be overcharged to a controllable value significantly greater than the available supply voltage. The operation of the chopper circuit is essentially as described above; however, when the capacitor 42 voltage starts discharging, i.e., when its lower terminal becomes positive with respect to bus 36, the diode 58 becomes forward bias and current flows through it and the serially connected inductor 60. During the recharging cycle as the voltage across capacitor 42 begins to increase in the forward direction, current flows not only through the diode 50 and motor circuit 10 but also through the diode 58 and inductor 60. When the voltage at the cathode terminal of SCR 24 reaches the value of the voltage at bus 36, motor current begins to flow through the diode 56 and the diode 50 is reverse biased. However, the inductive reactance of inductor 60 forces current to continue to flow through capacitor 42, diode 58 and inductor 60 to negative bus 36. This current flow will continue to pull the lower terminal of capacitor 42 toward a negative value which will be substantially less than the voltage on negative bus 36. Given appropriate reactance in inductor 60, the voltage on capacitor 42 can be caused to reach a value which may result in breakdown of the semiconductor devices connected in circuit with the capacitor. However, prior to reaching this voltage a gating signal can be applied to the SCR 62 to short circuit the inductor 60 and allow current through that inductor to circulate through the closed path formed by SCR 62. In effect the inductor 60 and SCR 62 provide the means for regulating the magnitude of voltage to be accumulated on the capacitor 42.

An adaptive control logic circuit 63 for regulating the magnitude of the voltage to be developed on capacitor 42 comprises a plurality of comparison means for monitoring the magnitude of the voltage on the capacitor and for comparing it to a desired reference value. As shown in FIG. 1, a first isolating amplifier 64 has first and second input terminals connected respectively to opposite plates of the capacitor 42. Isolating amplifier 64 provides an output signal $V_c$ which is representative of the voltage developed across the capacitor. As will be apparent, for purposes of illustration the circuitry shown in FIG. 1 is simplified to the extent that various resistive elements normally associated with a circuit in such an environment have been omitted. An output terminal of amplifier 64 is connected to a first input terminal of a comparator 66. A second input terminal of comparator 66 is connected to an output terminal of the current measuring device 54. Comparator 66 compares the voltage representative signal $V_c$ from amplifier 64 with the current representative signal $I_a$ from current measuring device 54 and provides an output signal when the ratio of commutation capacitor voltage to motor current is proper for a given equipment rating. Those skilled in the electronics art will recognize that resistive elements may be utilized to adjust the amplitudes of the respective signals to accommodate any desired ratio. The proper ratio between the voltage on capacitor 42 to the current through the motor 10 will assure that the capacitor 42 has sufficient available energy to commutate the SCR 24.

A second isolating amplifier 67 is connected to monitor the voltage on filter capacitor 38 and to provide a signal $V_f$ proportional to the filter voltage. The $V_f$ voltage signal is supplied to a first terminal of a second comparator 68 which comparator has a second input terminal connected to the output terminal of amplifier 64. Comparator 68 provides an enable signal whenever the voltage across capacitor 42 exceeds the filter voltage on bus 30. This signal is utilized to delay the gating of SCR 62 until it is forward biased since a gating signal prior to that time will not cause SCR 62 to become conductive. An output terminal of comparator 68 is connected to a first input terminal of an AND logic circuit 70. A second input terminal of logic circuit 70 is connected to an output terminal of comparator 66. The logic circuit 70 will provide an output signal only if both of its input signals are of the proper state. Thus, no signal will be provided from logic circuit 70 unless the voltage on capacitor 42 is greater than the voltage on bus 30 and only if the voltage on capacitor 42 exceeds by the proper ratio the magnitude of current flowing in the motor 10.

In some instances it is possible that the adaptive system, being responsive to the magnitude of load current, will attempt to call for a charge to be accumulated on capacitor 42 which is higher than is actually required for commutation. For example, in response to a fault current which may have reached several thousand amperes in magnitude, the adaptive system will call for an equivalent magnitude of charge to be accumulated on the capacitor 42. Accordingly, a protective feature is incorporated in the system to assure that capacitor 42 does not become charged to a level which may result in voltage breakdown of the semiconductor components in the chopper commutation circuit. This protective feature is implemented in an arrangement which overrides the adaptive system and forces a gating signal to be supplied to thyristor 62 whenever the potential on capacitor 42 exceeds a predetermined maximum voltage magnitude and also exceeds the voltage on capacitor 38.

Referring to FIG. 1, the aforementioned protective feature is implemented by comparing the voltage signal $V_c$, representative of the potential on capacitor 42, to a voltage reference signal $V_m$, representative of the maximum desirable voltage, in a third comparator 74. Accordingly, the output terminal of amplifier 64, at which the $V_c$ signal is produced, is connected to a first input terminal of comparator 74. The voltage reference signal $V_m$ is coupled to a second input terminal of comparator 74 from a voltage source to be described hereinafter. Comparator 74 will generate an enable signal (a logical 1 signal in the illustrative embodiment) whenever the magnitude of $V_c$ exceeds that of $V_m$. The enable signal is coupled from an output terminal of comparator 74 to a first input terminal of a logical AND circuit 75. A second input terminal of AND circuit 75 is connected to an output terminal of comparator 68 whereby AND circuit 75 will produce a logical 1 output signal when the potential on capacitor 42 exceeds the reference magnitude established by reference signal $V_m$, but only if the potential on capacitor 42 exceeds the potential on filter capacitor 38.

An output terminal of logical AND circuit 75 is connected to a first input terminal of a logical OR circuit 76. A second input terminal of OR circuit 76 is connected to an output terminal of AND circuit 70 whereby OR circuit 76 will produce a logical 1 signal responsive to either the conditions established by AND circuit 70 or AND circuit 75.

Although the signal developed by logic circuit 76 could be utilized to directly trigger the SCR 62, it has been found that transient noise voltages appearing in the feedback signals may give rise to undesired triggering of the SCR 62. Accordingly, a further inhibit function has been provided with an additional logic circuit 72. This logic circuit has as a first input signal the desired firing signal developed by logic circuit 76 and as a second input signal a timed clock signal or window signal $T_w$, i.e., a signal which is present only for a specific time period during each cycle of operation of the chopper circuit. Preferably the window signal $T_w$ would be initiated at the start of the commutation cycle and would last for some predetermined time period sufficient to assure that the capacitor 42 has attained an adequate charge.

The signal developed by AND circuit 72 is applied through a logical OR circuit 78 to an SCR firing circuit 80. The firing circuit 80 may be of a type well known in the art which provides sufficient drive power to the logical signal from OR circuit 78 to force SCR 62 into conduction. OR circuit 78 is utilized to provide two consecutive firing pulses to SCR 62. Such double firing provides greater assurance that the SCR will be gated into conduction. In the illustrated embodiment double firing is provided by connecting the output terminal of AND circuit 72 to a time delay circuit 82 which thereafter provides a delayed signal to a second input terminal of OR circuit 78. Since the OR circuit 78 provides an output signal whenever either of its input terminals is excited, two signals will thus be produced and supplied to the SCR firing circuit 80.

As will be appreciated from the above description, the SCR 62 is normally in a non-conductive condition and is gated into conduction whenever the charge on capacitor 42 reaches a magnitude determined by load current or whenever the charge attains a predetermined maximum value. As can be seen, the comparator 66 is responsive to the actual magnitude of current flowing in the motor 10, and thus effectively varies the timing of the firing signal to SCR 62 in a manner to adaptively adjust the commutation energy to an ideal value proportional to load current. The amount of excess energy which would ordinarily be dissipated in the chopper commutation circuit is thereby minimized.

The embodiment of FIG. 1 requires the addition of an inductor 60, an SCR 62 and a diode 58 to perform the desired function. However, when the load applied to the chopper circuit is a d-c electric traction motor, and particularly one which requires additional motor reactance such as that illustrated at 28, it has been found that the motor reactance and motor itself may be utilized in place of the inductor 60.

Figure 2:
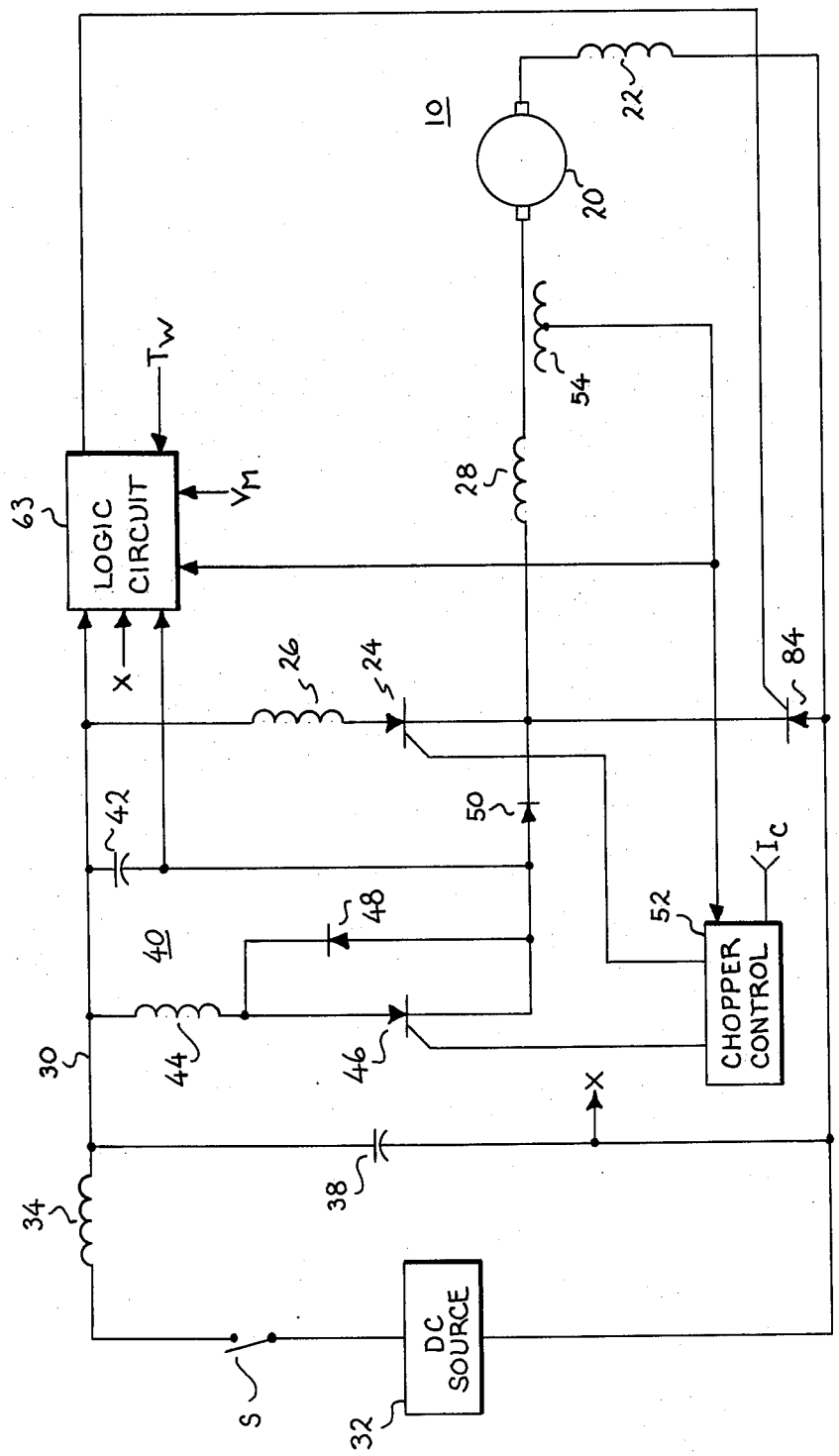
FIG. 2 is a simplified schematic diagram of a preferred embodiment of the present invention.

Referring now to FIG. 2, there is shown a further embodiment of the present invention in which the additional elements have been eliminated and the free wheeling diode replaced with a thyristor or SCR 84. The logic circuit 63 for controlling the conduction of SCR 84 is the same control circuit illustrated in FIG. 1 for controlling the SCR 62. Thus, the only difference between the circuit of FIG. 1 and that of FIG. 2 is in the replacement of the free wheeling diode 56 with the SCR 84 and the consequent elimination of the diode 58, inductor 60 and SCR 62. The operation of the circuit of FIG. 2 is substantially the same as was described with regard to FIG. 1. In FIG. 2, however, the charge on capacitor 42 is forced to accumulate by virtue of load current flowing through the motor 10. Although this tends to pull the voltage at the cathode of SCR 24 to a substantially lower value, the lower voltage does not have any significant affect on the operation of the chopper circuit so long as the voltage across the chopper circuit does not exceed the breakover voltage of the semiconductors in the circuit. The protection circuit described previously assures that gating of SCR 84 will occur prior to the breakover voltage being reached, i.e., the $V_m$ voltage reference will assure that a firing signal is provided to gate SCR 84 into conduction if the voltage developed on capacitor 42 attains the maximum allowable voltage and is of greater magnitude than the voltage on capacitor 38.

The embodiment illustrated in FIG. 2 is a preferred embodiment of the power circuit since it clearly minimizes the number of components required to control a d-c traction motor. However, other implementations of this adaptive energy concept are possible such as, for example, providing an additional power bus to which one terminal of the capacitor could be connected by a controllable switching element thus allowing the capacitor 42 to be charged to a separate voltage source.

Figure 3:
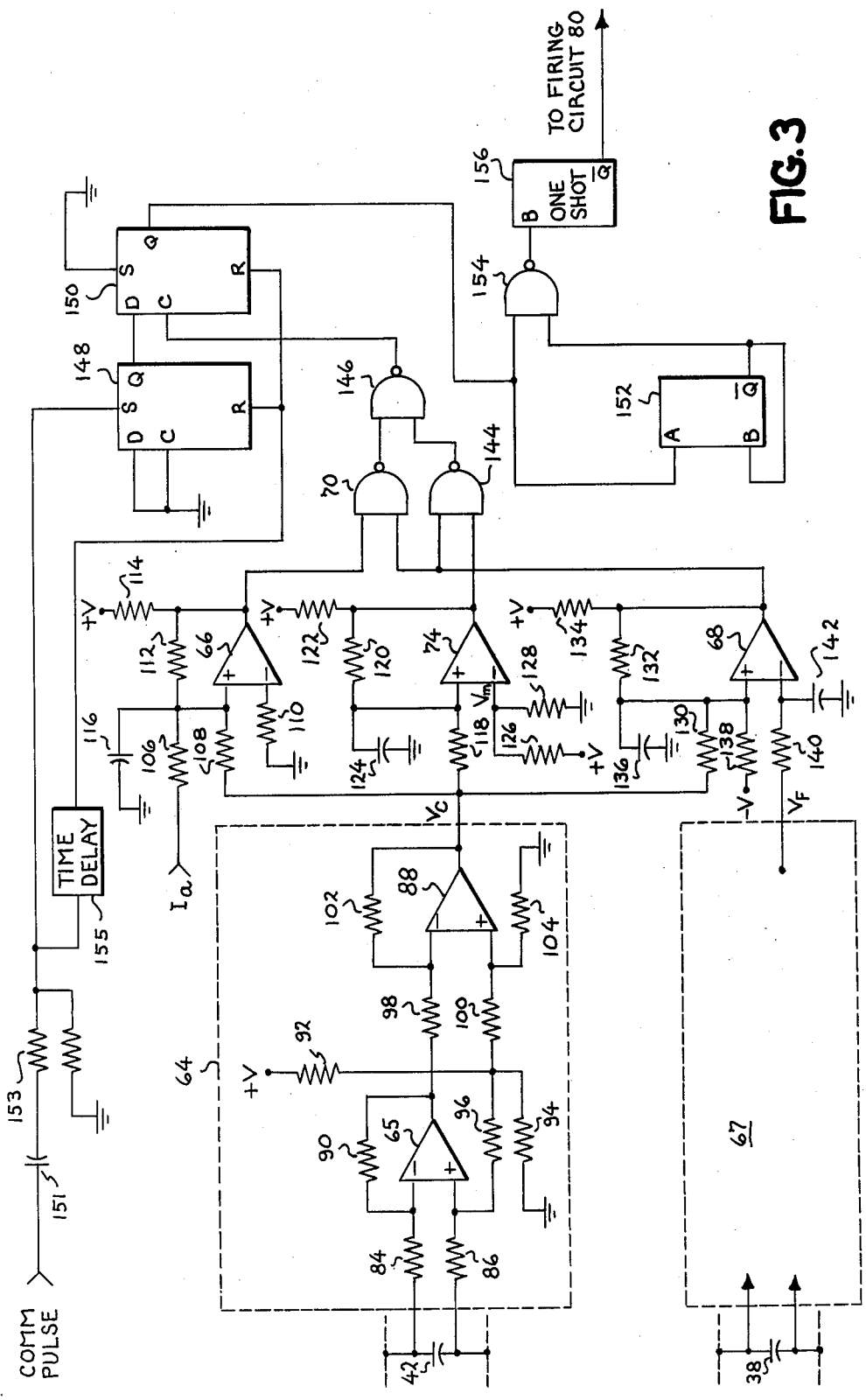
FIG. 3 is a detailed schematic diagram of a preferred implementation of the control circuit forming a part of the present invention.

Referring now to FIG. 3, there is illustrated a preferred embodiment of the adaptive control logic circuit 63 for controlling the magnitude of voltage developed on capacitor 42. The isolation circuit 64 which reduces the magnitude of the voltage on capacitor 42 to a usuable logic level while establishing low source impedance and less noise susceptibility is shown as comprising a pair of serially connected differential amplifiers 65 and 88. The upper terminal of capacitor 42 is connected to an inverting input terminal of differential amplifier 65 through a series resistor 84. Similarly the lower terminal of capacitor 42 is connected to the non-inverting input terminal of amplifier 65 through a series resistor 86. Both the resistor 84 and resistor 86 are of relatively large value in order to isolate the amplifier 65 from the large voltages appearing on capacitor 42. In the implementation illustrated in FIG. 3 the second differential amplifier 88 is connected in series with amplifier 65 to further isolate the voltage signal developed on capacitor 42 prior to converting it to a voltage signal referenced to ground potential. Amplifier 65 includes a stabilizing feedback resistor 90 which interconnects its output terminal and its inverting input terminal. A voltage divider comprising resistors 92 and 94 is serially connected between a source of voltage $+V$ and ground potential. The intermediate point between the resistors 92 and 94 is connected through another resistor 96 to the non-inverting input terminal of amplifier 65. A voltage proportional to the voltage at the lower terminal of capacitor 42 is developed at the junction intermediate resistors 92 and 94. The output terminal of amplifier 65 is connected through a resistor 98 to the inverting input terminal of amplifier 88. The junction intermediate resistors 92 and 94 is connected through a resistor 100 to the non-inverting input terminal of amplifier 88. The amplifier 88 is connected as a differential operational amplifier and includes a feedback resistor 102 connected between its inverting input terminal and its output terminal. An additional resistor 104 is connected between its non-inverting input terminal and ground potential. The amplifier 88 provides the voltage reference signal $V_c$ representative of the voltage on capacitor 42 with reference to ground potential.

The filter voltage signal $V_f$ is derived in a manner similar to that for deriving the voltage signal $V_c$. Voltage isolation circuit 67 is identical to circuit 64 and is therefore shown only in block form. The voltage developed on filter capacitor 38, which voltage represents the available source voltage, is monitored by circuit 67 which circuit produces the signal $V_f$ representative of the magnitude of the filter voltage.

The signal $I_a$ from current measuring device 54 is applied to a non-inverting input terminal of comparator 66 through a series resistor 106. The voltage reference signal $V_c$ from circuit 64 is applied to the same non-inverting input terminal through a series resistor 108. Accordingly, the two signals, i.e., the $I_a$ signal and the voltage reference signal $V_c$, are summed at the non-inverting input terminal of comparator 66. The inverting input terminal of comparator 66 is referenced to ground through a resistor 110. In order to assure rapid switching of comparator 66 there is also provided a positive feedback path from its output terminal to its non-inverting input terminal through a series resistor 112. A pull up resistor 114 connects the output terminal of comparator 66 to a source of voltage +V. In addition a noise filter capacitor 116 is connected between the non-inverting input terminal and ground potential. Amplifier 66 is arranged to provide a logical 1 output signal (a positive voltage signal) when the voltage on capacitor 42 exceeds a predetermined value which varies as a function of the current through the motor 10.

The voltage reference signal $V_c$ from circuit 64 is also applied through a resistor 118 to the non-inverting input terminal of comparator 74. Comparator 74 is connected in essentially the same configuration as comparator 66, i.e., a positive feedback resistor 120 is connected between its output terminal and its non-inverting input terminal and a pull up resistor 122 is connected between the voltage source +V and the output terminal of the amplifier. Furthermore, a noise filter capacitor 124 is connected between the non-inverting terminal and ground potential. The signal representative of the maximum allowable voltage $V_m$ on capacitor 42 is supplied by a voltage divider comprising resistors 126 and 128 which are serially connected between source +V and ground potential. The voltage $V_m$ is developed at the junction intermediate the two resistors 126 and 128 which junction is connected to the inverting input terminal of comparator 74. Comparator 74 thus provides a logical 1 output signal whenever the voltage on capacitor 42 exceeds the predetermined maximum voltage allowable on the capacitor as established by the $V_m$ signal.

The output terminal of circuit 64 is also connected through a resistor 130 to a non-inverting input terminal of comparator 68. Again, comparator 68 is essentially the same as comparators 74 and 66 and includes a positive feedback resistor 132 connected between its non-inverting input terminal and its output terminal. A pull up resistor 134 is connected between its output terminal and a source of voltage +V. A noise filter capacitor 136 is also connected between its non-inverting input terminal and ground potential to protect the input terminal from noise spikes. To compensate for tolerances in the voltage isolator circuits for $V_c$ and $V_f$ and guarantee that $V_c$ is greater than $V_f$, it has been found necessary to provide a slight offset at the input terminal of comparator 68. This offset is provided by a negative voltage signal supplied from a negative voltage source −V through a resistor 138 to the non-inverting input terminal of comparator 68. The $V_f$ signal, i.e., the signal representative of the voltage on bus 30, is applied to the inverting input terminal of comparator 68 through a series connected resistor 140. An additional noise filter capacitor 142 is connected between this inverting input terminal and ground potential. The comparator 68 is thus connected to provide a logic 1 output signal whenever the voltage on capacitor 42 exceeds the voltage on the filter capacitor 38 by some predetermined level.

As noted previously, the signal developed at the output terminal of comparator 66 is applied to a first input terminal of a logic gate 70. A second input terminal of logic gate 70 is connected to receive an enable signal developed at the output terminal of comparator 68. Although in FIG. 1 the logic gate 70 was illustrated as an AND gate, it can be seen that the logic gate 70 is preferably implemented as a NAND logic gate. The use of a NAND logic gate rather than AND or OR logic gates is continued in the additional logic functions of the illustrative embodiment since it is more economical to obtain logic gates in NAND form. Accordingly, the logic circuits 75 and 76 illustrated in FIG. 1 as an AND and an OR gate respectively, are implemented through the use of two NAND gates 114 and 146. The output terminal of comparator 74 is connected to one input terminal of NAND gate 144 and the output terminal of comparator 68 is connected to another input terminal of NAND gate 144. An output terminal of NAND gate 144 is connected to an input terminal of NAND gate 146. A second input terminal of NAND gate 146 is connected to an output terminal of NAND gate 70. As is well known the NAND gate will provide a logical 1 output signal whenever either of its input terminals is excited by a logical 0 signal. Thus, by providing inversion of the signals developed by the comparators 66, 74, and 68, the NAND gate 146 essentially functions as an OR logic circuit.

In the implementation illustrated in FIG. 3, the AND logic circuit 72 is implemented by a pair of D-type multivibrators or flipflops 148 and 150. The flipflop 148 has its clock and D input terminal grounded and its SET input terminal connected to receive a clock signal synchronized to the commutating gate signal (the COMM pulse) developed by chopper control circuit 52. The Q output terminal of flipflop 148 is connected to the D input terminal of flipflop 150. The SET input terminal of flipflop 150 is grounded and its CLOCK input terminal is connected to the output terminal of NAND gate 146. The RESET terminals of both flipflops 148 and 150 are connected to an output terminal of a time delay circuit 155 for receiving a reset signal which is delayed from the set signal by a predetermined time period. The time period between the set and reset signals to flipflops 148 and 150 represents the "window" signal described with reference to FIG. 1.

As is illustrated in FIG. 3, a preferred method of generating the window signal is to apply the commutating gate signal (COMM pulse) through a capacitor 151 and resistor 153 to the SET terminal of flipflop 148 to start the "window" time period. The window is terminated by delaying the COMM pulse through time delay circuit 155 and supplying the delayed COMM pulse to the RESET terminals of flipflops 148 and 150. In this manner the flipflop 148 will be "set" whenever a gate signal is applied to commutating thyristor 46. This signal therefore initiates the time period during which it is permissible to pass control signals for setting the magnitude of voltage on capacitor 42. The delayed COMM pulse signal occurring a predetermined time period after the COMM pulse terminates the time period (the "window") during which the pulses may be applied to control the voltage on capacitor 42.

When flipflop 148 is set by the COMM pulse signal, a logic 1 signal is applied to the D input terminal of flipflop 150 from the Q output terminal of flipflop 148. If a logical 1 signal is applied to the clock input terminal of flipflop 150 from NAND gate 146 during the time that the D input terminal is at a logic 1, the Q output terminal of flipflop 150 will transition to a logic 1 condition. In this manner the flipflops 148 and 150 function as an AND circuit to allow the signal from NAND gate 146 to pass through if, and only if, the signal occurs during a predetermined time period after the commutation gating signal is produced.

The Q output terminal of flipflop 150 is connected to an input terminal of a monostable (one-shot) multivibrator 152. Multivibrator 152 is utilized as a time delay circuit corresponding to that indicated in FIG. 1 by time delay circuit 82. As discussed with reference to FIG. 1, the time delay circuit is useful in generating double-pulsing of free wheeling thyristor 84. The logical OR circuit 78 of FIG. 1 is implemented by a NAND gate 154 in FIG. 3 since the NAND gate functions are more readily available. The NAND gate 154 has a first input terminal connected to the Q output terminal of flipflop 150 and a second input terminal connected to a $\overline{Q}$ output terminal of multivibrator 152. An output terminal of NAND gate 154 is connected to an input terminal of another one-shot multivibrator 156. Multivibrator 156 provides a gating pulse to the firing circuit 80 (see FIG. 1) which provides the firing pulses to the free wheeling thyristor. Since the firing circuit 80 is of a type well known in the art, the detailed implementation of such a circuit is not illustrated.

In the operation of the circuit illustrated in FIG. 3, the $V_c$ signal is applied to the three comparators 66, 74, and 68. When $V_c$ exceeds the $I_a$ signal, comparator 66 will change state and provide a logic 1 output signal to the first input terminal of NAND gate 70. However, unless the $V_c$ signal has exceeded the magnitude of the $V_f$ signal, then the NAND gate 70 will not respond to the signal from comparator 66 and the output signal from NAND gate 70 will remain at a logic 1 condition. On the other hand, if comparator 68 has changed state, thus indicating that the voltage on capacitor 42 exceeds the voltage on bus 30, a logic 1 signal will be provided to the second input terminal of NAND gate 70 and its output signal will then transition to a logic 0 condition. When a logic 0 signal is applied to the first input terminal of NAND gate 146 its output signal immediately transitions to a logic 1 signal. But if the voltage on capacitor 42 had exceeded the predetermined maximum allowable voltage $V_m$ and also the magnitude of the capacitor 38 voltage prior to this event, the comparators 68 and 74 would have transitioned to logic 1 output states which, when applied to NAND gate 144, would have already provided a logic 0 output signal to the second input terminal of NAND gate 146. This logic 0 input signal would also force the output signal from NAND gate 146 to a logic 1 transition. Accordingly, either combination of the above-described events will result in a clock signal being applied to the clock input terminal of flipflop 150 from NAND gate 146. If the clock signal is applied to flipflop 150 outside of the time period established and the "window" period, both flipflop 148 and flipflop 150 will be in a reset condition and their Q output terminals will be at logic 0 states. Since the clock signal can only clock the signal on the D input terminal to the Q output terminal, it will be apparent that the output signal on the Q output terminal of flipflop 150 will remain at a logic 0 condition. However, if the clock signal from NAND gate 146 occurs during the predetermined "window" period, the signal on the D input terminal of flipflop 150 will be a logic 1 and the clock signal will cause the Q output terminal to develop a logic 1 signal. The logic 1 signal from the Q output terminal of flipflop 150 will be applied to the first input terminal of NAND gate 154 and also to the input terminal of one-shot multivibrator 152. The second input terminal of NAND gate 154 is connected to the inverted output terminal of multivibrator 152 such that a logic 1 signal is normally applied to the NAND gate 154. Accordingly, when the signal at the Q output terminal of flipflop 150 transitions to a logic 1 state, both the input terminals of NAND gate 154 will be receiving logic 1 signals and the output signal from NAND gate 154 will transition to a logic 0 state. This transition will thus trigger one-shot multivibrator 156 and result in a gating signal being applied to the SCR firing circuit 80. At the same time the multivibrator 152 will change state in response to the signal from flipflop 150 and the signal on the second input of NAND gate 154 will thus revert, within microseconds, back to a logic 0 state. This will terminate the logic 0 signal at the output terminal of NAND gate 154 for a time period designed into multivibrator 152. Whenever multivibrator 152 times out, its $\overline{Q}$ output terminal will revert to a logic 1 and a second firing pulse in the form of a logic 1 to logic 0 transition will occur at the output terminal of NAND gate 154. This will assure that the one-shot multivibrator 156 is again triggered and applied a second firing signal to the SCR firing circuit 80.

It will be appreciated that the above-described invention provides a means for regulating the voltage on a commutation capacitor in a chopper commutation circuit. This regulation allows the size of the commutation circuit to be significantly reduced since it is no longer required that the commutation circuit be designed for maximum current at the lowest possible voltage. There has been described several embodiments of the present invention, including a preferred embodiment in which the free wheeling diode in a motor circuit is replaced by a free wheeling thyristor. Furthermore, a control circuit for implementing the present invention has been described in detail.

While the principles of the invention have now been made clear in an illustrative embodiment, it will be immediately obvious to those skilled in the art many modifications, constructions and arrangements used in the practice of the invention which are particularly adapted for specific environments and operating requirements without departing from those principles. The appended claims are therefore intended to cover and embrace any such modifications, subject only to the limit and true spirit and scope of the invention.

What I claim as new and desire to secure by Letters Patent of the United States is:

1. In a power control system including a time ratio control electric power circuit connected between an electric load and a pair of d-c power busses of relatively positive and negative potential that are adapted to be connected to a source of d-c electric power, through an electric filter comprising at least a filter capacitor connected between the positive and negative busses, the power circuit including a cyclically turned-on main load current carrying thyristor and a commutation circuit operative to periodically turn-off the main thyristor, the commutating circuit including a commutation capacitor tht discharges during the turn-off process of the commutating circuit, the commutation capacitor being connected in a path that includes the d-c source and that conducts charging current during intervals when the main thyristor is turned-off, the improvement comprising:

(a) inductive means serially connected in said charging current path;

(b) controllable switch means connected in shunt with said inductive means and having a high resistance blocking state and a relatively low resistance conducting state;

(c) unidirectional conducting means connected in said charging current path and poled to conduct said charging current; and (d) gating means coupled to said commutating capacitor and to said switch means for forcing said switch means to its conducting state in response to the voltage across said commutating capacitor attaining a predetermined variable magnitude, said gating means being coupled to monitor the magnitude of said main load current and to adjust said predetermined variable magnitude as a direct function of the magnitude of said main load current.

2. The improvement of claim 1 wherein said load is an adjustable speed d-c motor and said inductive means comprises said motor.

3. The improvement of claim 2 wherein said gating means includes means coupled to said filter capacitor for monitoring the voltage available between said positive and negative power busses, and means for delaying operation of said switching means to its conducting state until the voltage on said commutating capacitor is at least as large in magnitude as said filter capacitor voltage.

4. The improvement of claim 3 wherein said gating means includes means for forcing said switch means to a conducting state when the voltage on said commutating capacitor attains a predetermined maximum magnitude which is independent of said predetermined variable magnitude.

5. The improvement of claims 2, 3, or 4 wherein said switch means comprises a gate turn-on thyristor poled to conduct current in opposition to said charging current.

6. The improvement of claims 3 or 4 wherein said gating means is operable to force said switch means to its conducting state only during a limited time interval commencing at the beginning of the turn-off process of the commutation circuit.

7. The improvement of claim 6 wherein said gating means includes means for generating a first gating signal for said switch means and thereafter a second gating signal which is delayed by a predetermined time interval, said first gating signal being generated in response to said commutating capacitor voltage attaining a magnitude at least as large as the magnitude of said filter capacitor voltage and no larger than the lesser of said predetermined variable magnitude or said predetermined maximum magnitude which exceeds the magnitude of said filter capacitor voltage.

* * * * *

UNITED STATES PATENT AND TRADEMARK OFFICE
CERTIFICATE OF CORRECTION

PATENT NO. : 4,284,938

DATED : August 18, 1981

INVENTOR(S) : Ronald B. Bailey

It is certified that error appears in the above—identified patent and that said Letters Patent is hereby corrected as shown below:

Column 16, line 3, "switching" should read -- switch --.

Signed and Sealed this

Twenty-fourth Day of November 1981

[SEAL]

Attest:

GERALD J. MOSSINGHOFF

Attesting Officer

Commissioner of Patents and Trademarks